United States Patent
McNeilus et al.

(10) Patent No.: US 10,710,273 B2
(45) Date of Patent: Jul. 14, 2020

(54) NONMETALLIC COLLECTOR

(71) Applicant: Con-Tech Manufacturing, Inc., Dodge Center, MN (US)

(72) Inventors: Grant McNeilus, Dodge Center, MN (US); Brian Mehldahl, Brownsdale, MN (US); Jay Attleson, Rochester, MN (US)

(73) Assignee: Con-Tech Manufacturing, Inc., Dodge Center, MN (US)

( * ) Notice: Subject to any disclaimer, the term of this patent is extended or adjusted under 35 U.S.C. 154(b) by 122 days.

(21) Appl. No.: 15/899,359

(22) Filed: Feb. 19, 2018

(65) Prior Publication Data

US 2019/0255736 A1    Aug. 22, 2019

(51) Int. Cl.
| | |
|---|---|
| *B28C 5/00* | (2006.01) |
| *B28C 5/42* | (2006.01) |
| *B28C 7/16* | (2006.01) |
| *B28C 7/06* | (2006.01) |

(52) U.S. Cl.
CPC ........ *B28C 5/4265* (2013.01); *B28C 5/4248* (2013.01); *B28C 7/168* (2013.01); *B28C 7/067* (2013.01); *B60Y 2200/41* (2013.01); *B60Y 2304/03* (2013.01)

(58) Field of Classification Search
CPC ..... B28C 5/4265; B28C 5/4248; B28C 7/168; B28C 7/067; B60Y 2200/41; B60Y 2304/03
See application file for complete search history.

(56) References Cited

U.S. PATENT DOCUMENTS

| | | | |
|---|---|---|---|
| 4,054,194 A * | 10/1977 | Davis | B28C 5/4248 193/10 |
| 5,056,641 A | 10/1991 | Loefke et al. | |
| 5,178,457 A | 1/1993 | Helmy | |
| 5,902,311 A | 5/1999 | Andreas et al. | |
| 7,578,379 B2 | 8/2009 | Gillmore et al. | |
| 7,730,903 B2 * | 6/2010 | Lindblom | B28C 5/4231 137/259 |
| 8,522,948 B1 | 9/2013 | Galvin, IV | |
| 2008/0291771 A1 | 11/2008 | Khouri et al. | |
| 2009/0050438 A1 | 2/2009 | Gillmore et al. | |

* cited by examiner

*Primary Examiner* — Anshu Bhatia

(74) *Attorney, Agent, or Firm* — Craig J. Lervick; Larkin Hoffman Daly & Lindgren Ltd.

(57) ABSTRACT

To provide a lighter weight and more robust component for use on a concrete mixer truck, a collector is formed of a non-metallic material which has more desirable characteristics. The collector is further strengthened by providing internal reinforcing structures and reinforced mounting structures so the collector can be effectively coupled to the concrete mixer truck. Additionally, the non-metallic material has desirable characteristics, such as low surface friction levels, high strength to weight ratios, and desirable puncture resistance. All of these characteristics combine to provide a lighter weight, more effective collector.

13 Claims, 5 Drawing Sheets

NONMETALLIC COLLECTOR

BACKGROUND

Concrete mixer trucks are fairly well-known/well-understood pieces of equipment, and are widely used in the construction industry. As is appreciated, these trucks are utilized to mix and transport concrete to various job sites, including building sites, road construction projects, etc. In addition, Concrete mixer trucks are typically used in very harsh environments and are designed to handle very rugged materials. Obviously, these vehicles navigate a wide variety of roadways, including highways, city streets, county roads, gravel roads and other rugged terrain. In many cases, these trucks will also be required to access construction sites, which often do not include maintained roads. Due to these requirements, durability is required.

The handling of concrete itself is a dirty and harsh undertaking. The weight and abrasive nature of the concrete itself requires that handling equipment is very robust. Concrete will often adhere to many surfaces and structures of a mixing truck, and has the potential for causing excess wear and/or damage. As such, it would be highly beneficial to form components and portions of a concrete mixing truck from materials which are 'concrete resistant." This is challenging however, due to the general strength and durability requirements, which often suggests that steel and various metals are utilized.

Aside from the generally harsh characteristics of concrete, cleaning technologies also create challenges. One approach to cleaning concrete mixer truck involves the use of acids and other chemicals. While this is extremely efficient, it also causes corrosion and related deterioration of metal components.

As generally suggested above, it is beneficial to use optimum components on the concrete mixer truck, which perform well, are durable, and also help to reduce overall weight. One such approach to reducing weight involves the use alternative materials. That said, special care must be taken to ensure strength, durability and manufacturability requirements are met. Given the harsh operating conditions encountered and the challenges related to handling concrete, the use of alternative materials has not been widely accepted. Steel remains the primary material utilized for most truck components, as it provides the level of strength and durability needed.

BRIEF DESCRIPTION OF THE DRAWINGS

Further advantages of the invention will be appreciated by reading the detailed description outlined below, in conjunction with the drawings in which.

DESCRIPTION

Figure 1:
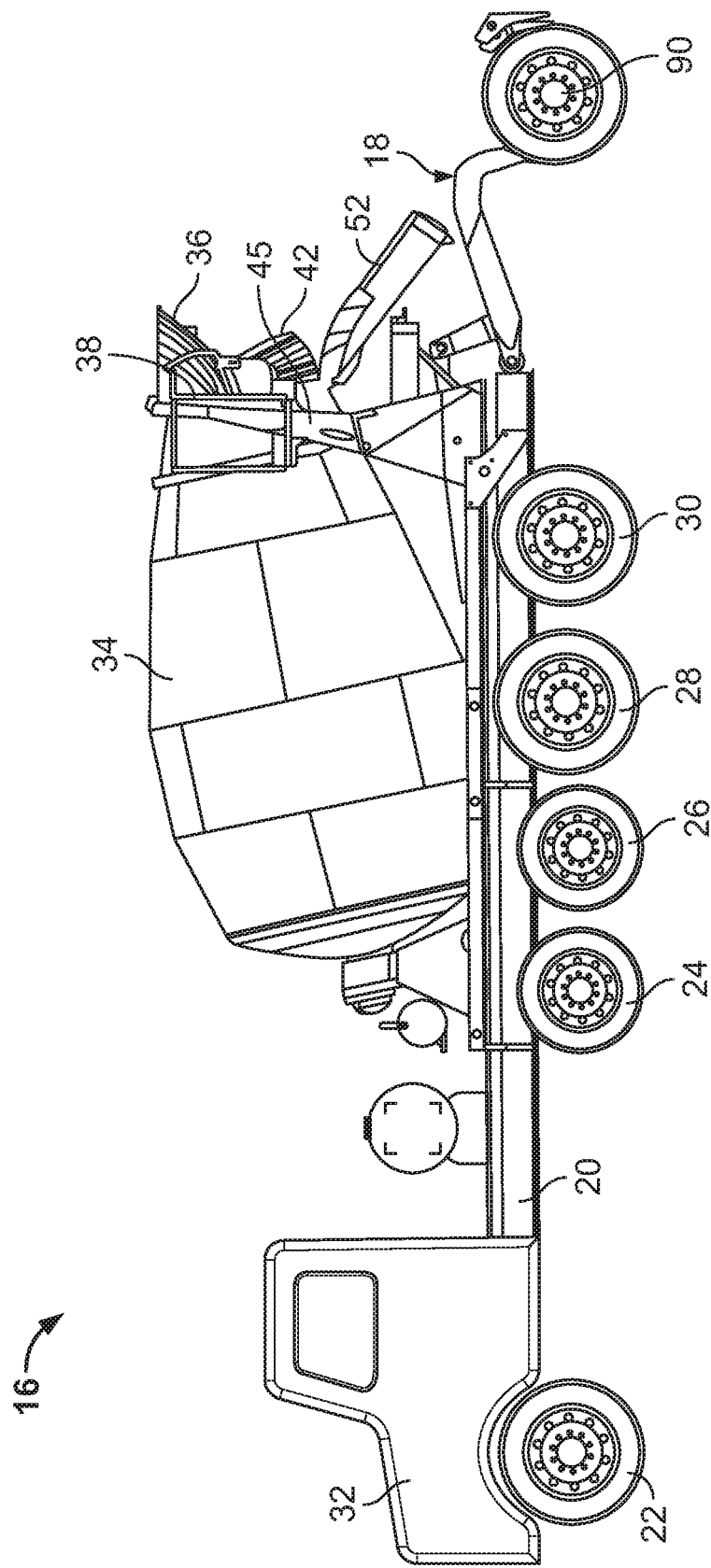
FIG. 1 is general illustration showing the common features of a concrete mixer truck.

Turning now to the drawings, FIG. 1 illustrates an example concrete mixer truck or vehicle 16. Vehicle 16 includes a main frame or chassis 20 supported by several wheel/axle assemblies including a forward assembly 22 (i.e. front wheel) for steering, and additional load bearing assemblies 24, 26, 28, and 30 (i.e. wheels). Components supported by the chassis 20 include a cab 32, a mixing drum 34 supported to rotate relative to the chassis 20, and a charge hopper 36 located behind an upper opening 38 of drum 34. As is known by those familiar with concrete mixer trucks, charge hopper 36 is specifically configured to facilitate the loading of materials into drum 34. As also shown, many of these components are supported by an upright frame element 45 coupled to a rear part of chassis 20, so they can be appropriately positioned for operation.

In this particular embodiment, an auxiliary axle system 90 is included to help transfer and/or balance necessary loads. As also shown, mixing truck 16 includes a collection chute, or collector 42, positioned below charge hopper 36, and a discharge chute 52 situated below the collection chute 42. As is recognized, each of these components are also supported by upright frame member 45, and are uniquely configured to accommodate the delivery of concrete is a controlled and efficient manner.

As will be appreciated, each component of the concrete mixer truck is important to the overall operation. Consequently, each must be designed for optimum operability and most efficient use. One of these components is collector 42. Generally speaking, collector 42 is utilized in the unloading and discharge of concrete carried by drum 34. As is well known, drum 34 includes a number of internal fins (not shown) which are used for the mixing and discharge of concrete. When drum 34 is appropriately rotated, the fins will urge concrete toward opening 38, which is situated above collector 42. Based upon this orientation and forces of gravity, concrete will fall from drum 34 into collector 42. Collector 42 has an opening situated on a lower portion thereof, which will direct concrete to distribution chute 52. With these relationships in mind, collector 42 must be configured to accommodate the flow of concrete across the inner surfaces thereof. Consequently the materials used for collector 42 must be durable and resilient.

In an effort to significantly reduce weight and to improve manufacturability of trucks, the embodiments outlined below make use of a non-metallic material to form composite collector 42. As described below, collector 42 is designed to ensure that sufficient levels of strength are obtained, since concrete is typically heavy and harsh. In present day concrete mixer trucks, this strength is typically achieved using steel parts. That said, non-metallic materials do not have the same strength and durability characteristics, and thus it is often complicated to incorporate these materials. To address this issue, the embodiments outlined below utilize multiple design features to achieve the desired strength/durability requirements.

In certain situations, the present application refers to "composite collector 42" for convenience. Those skilled in the art will appreciate that various components, including collector 42, could be formed from many different materials including polymers, plastics, thermoplastics, carbon fibers, other non-metallic materials, etc. It is particularly intended that collector 42 be formed from a non-metallic material which has certain characteristics. As further outlined below, any material can be used which will provide the desired balance of strength, durability, pliability, weight, chemical resistance/tolerance and surface characteristics (e.g. coefficient of friction). It is contemplated that all of these materials are within the scope of the present description, and the discussion below is not limited to a "composite" material which has two different materials.

Figure 2:
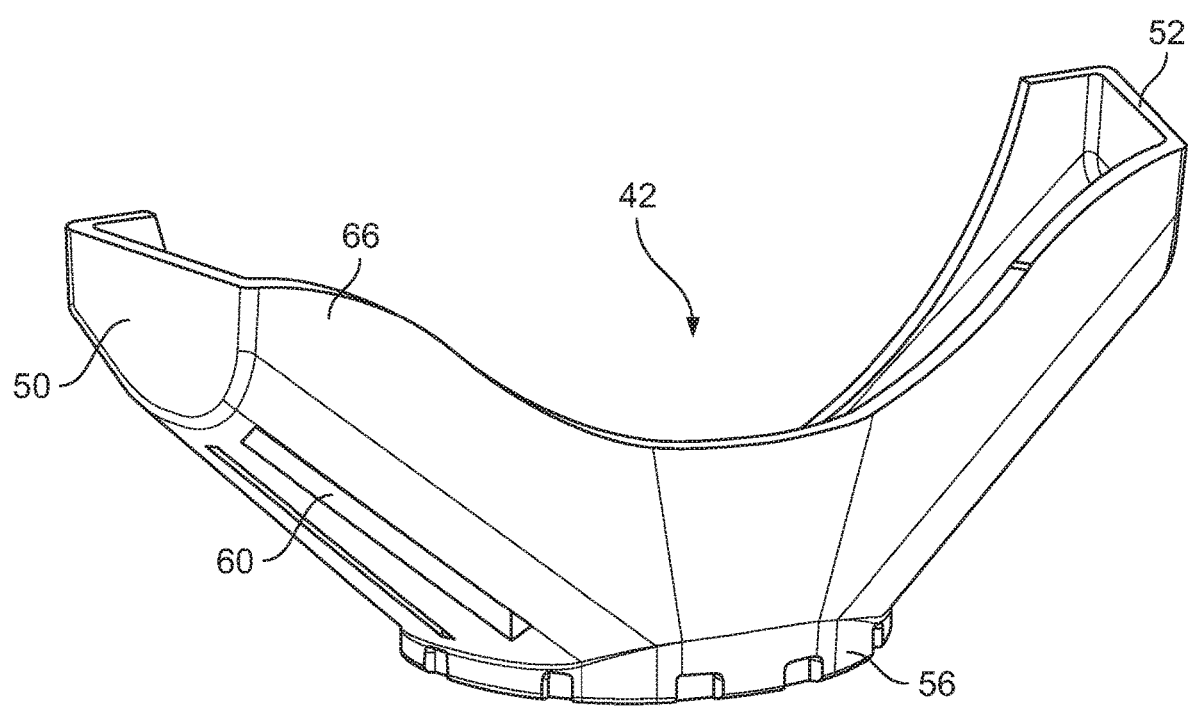
FIG. 2 is a perspective view of a nonmetallic collector.
Figure 3:
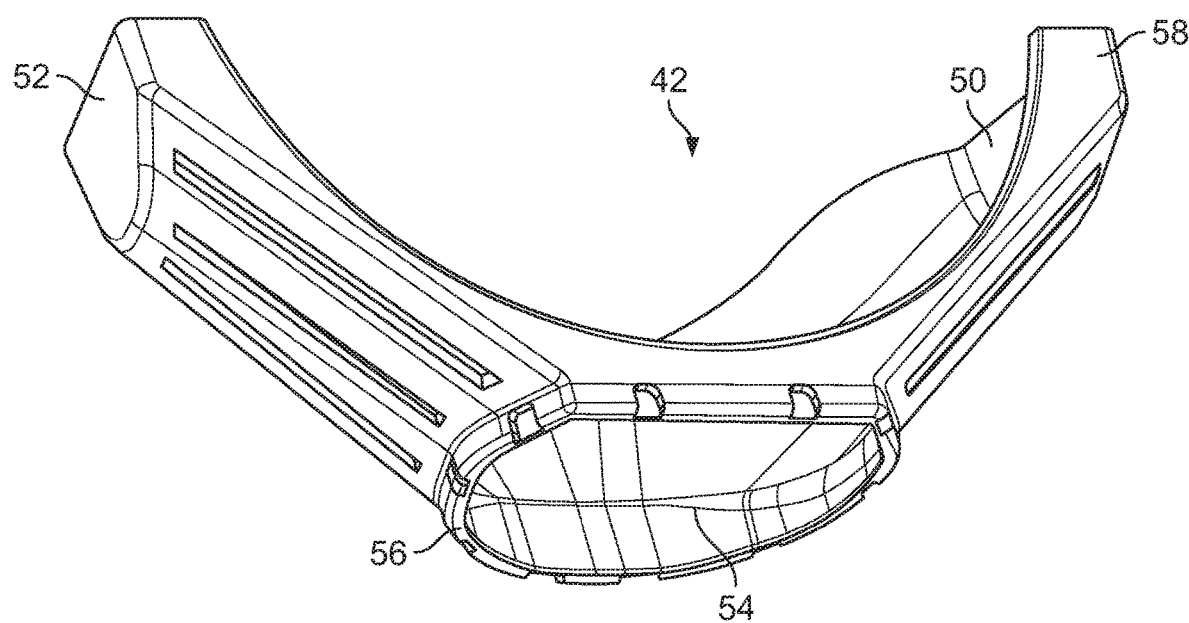
FIG. 3 is a bottom perspective view of the nonmetallic collector.
Figure 4:
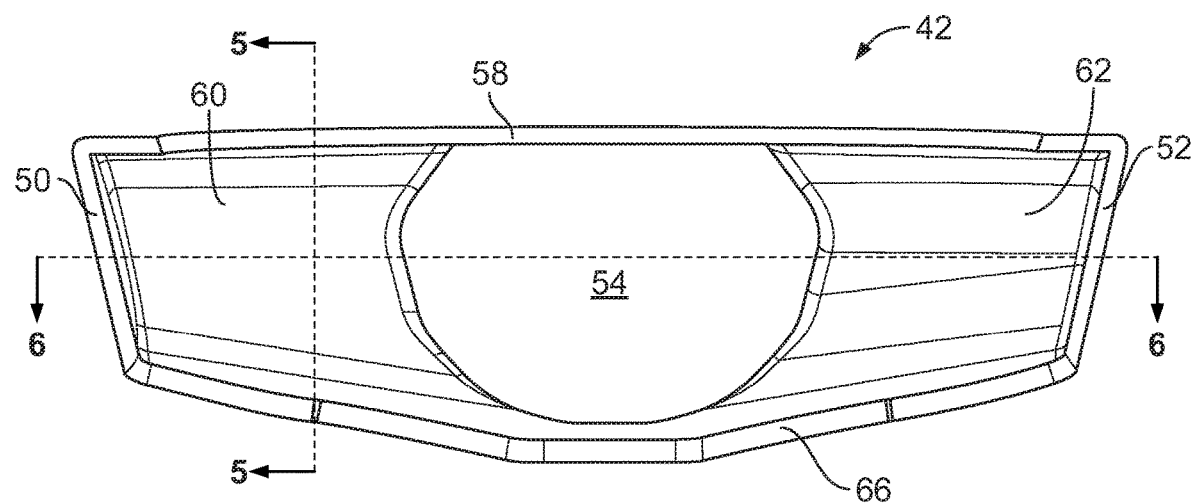
FIG. 4 is a top view of the nonmetallic collector.

Referring now to FIGS. 2-4 one embodiment of composite collector 42 is shown in isolation. Those skilled in the art will recognize that collector 42 is configured to be attached to a rear portion of a concrete mixer truck (i.e. the upright frame element 45), and to carry out the functions outlined above. FIG. 2 illustrates collector 42 as shown from the rear, while FIG. 3 illustrates a front lower perspective and FIG. 4 illustrates a top view. Starting with FIG. 2, collector 42 is generally described as an elongated conical item, having a first mounting surface 50 and a second mounting surface 52 located on upper ends thereof. As will be appreciated, these surfaces accommodate the attachment of collector 42 to portions upright frame element 45. It is contemplated that collector 42 may be directly bolted to those framework sections, or alternatively a connecting or mounting plate attached between first mounting surface 50 and second mounting surface 52, and the framework could be utilized (neither this mounting plate nor the framework sections being illustrated in the figures).

As best illustrated in FIGS. 3 & 4, collector 42 has an opening 54 positioned at a lower bottom side thereof. Defining opening 54 is a ridge portion 56 which completely surrounds opening 54 along a bottom side thereof. Ridge 56 provides an appropriate structure for potentially attaching collector 42 to other components, such as mounting guards, shields or related equipment as needed. As will be appreciated, concrete is distributed through opening 54 to related components (i.e. distribution chute 52). Extending upwardly from rim 56 is a rear wall 58, a first curved sidewall 60 and a second curved sidewall 62. As will be appreciated, first curved sidewall 60 extends upwardly from rim 56 to first mounting surface 50. Similarly, second curved sidewall 62 extends upwardly from rim 56 to second mounting surface 52. Lastly, collector 42 includes an arching front wall 66. As shown, each of these structures are integrally combined with one another to form a single unit which is capable of functioning as described above.

As best shown in the embodiment of FIG. 4, the wall structures have a thickness which is specifically selected to provide strength, provide mounting capabilities for the particular application, and to enhance the manufacturability of the collector 42. The wall thickness and particular details of the wall design can vary considerably, depending on many different factors. In one embodiment, the wall structures are all roughly one inch thick and formed of a non-metallic material, such as many well-known polymers or composites. In other embodiments, the general wall thickness could be less than one inch, depending on the materials used or any number of reinforcing structures used to provide the necessary strength. Each of these variations are considered to be within the scope of the present application.

Figure 5:
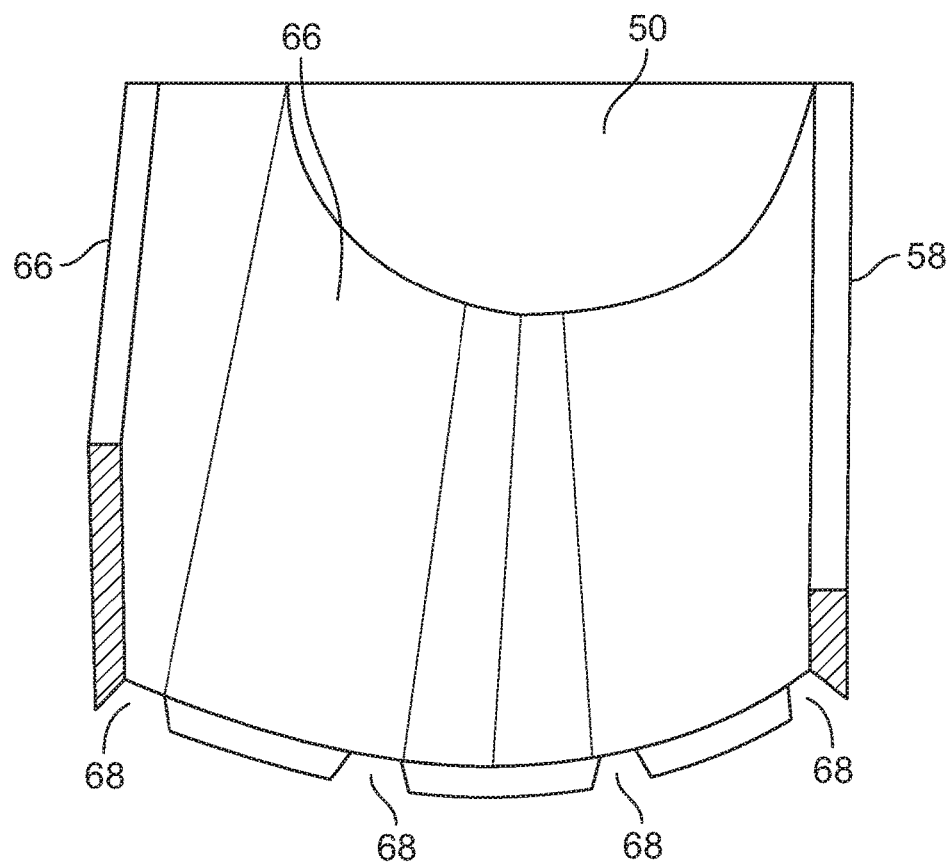
FIG. 5 is a first cross sectional view of the nonmetallic collector.
Figure 6:
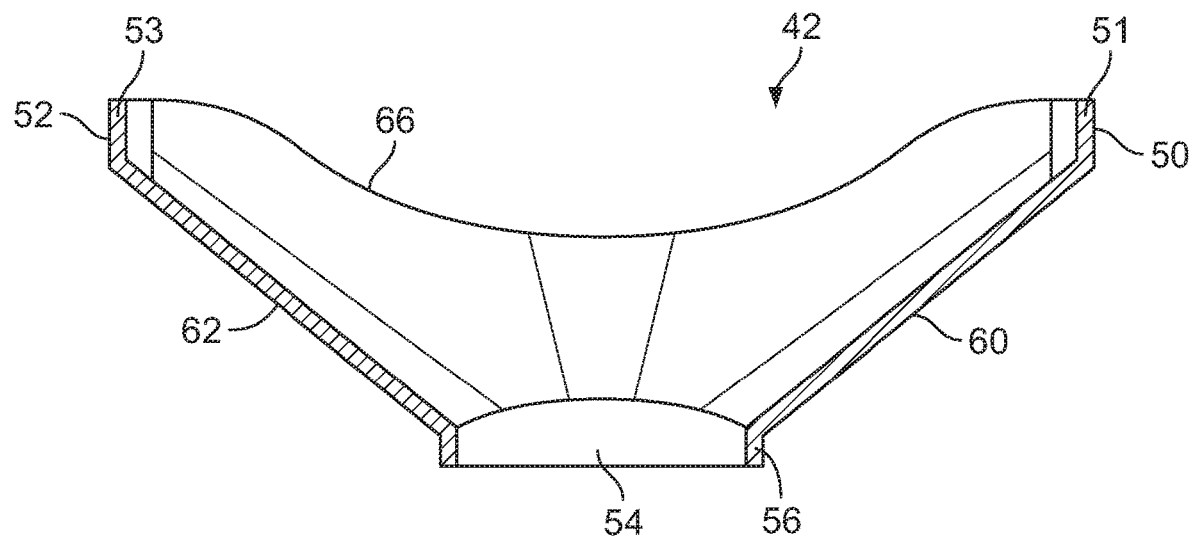
FIG. 6 is a second cross sectional view of the nonmetallic collector.

Turning now to FIGS. 5 & 6, the structure of the various walls in this embodiment is shown in more detail. More specifically, these figures include cross sectional views as noted in FIG. 4, and illustrate certain internal features and characteristics for collector 42 (i.e. FIG. 5 is a cross-sectional view along section line 5-5 of FIG. 4, while FIG. 6 is a cross-sectional view along section line 6-6 of FIG. 4). As shown, first curved sidewall 60, second curved sidewall 62, rim 56, and a first mounting wall 51 and a second mounting wall 53 are all designed to have a structure particularly configured to meet the needs of collector 42, having a. In one embodiment, each wall structure is one inch thick, and includes both an inner panel and an outer panel. As best illustrated in FIG. 5, a number of indented grooves 68 are included in curved sidewall 60. Specifically, these grooves are formed in an outer panel of curved sidewall 60 and help to strengthen this region. More specifically, grooves 68 provide additional rigidity and support for this portion of collector 42, thus allowing it to handle loads encountered when concrete is dispensed from drum 34. In addition, it will be recognized that any number of internal ribs or connecting structures could be utilized between an inner panel and an outer panel, making up the various wall structures.

As suggested above, it is contemplated that the non-metallic collector 42 is formed of a polymer or a composite material, such as polyethylene, carbon fiber enforced materials, etc. As will be recognized, these materials each have significant strength and surface characteristics to carry out the necessary functions. This material makes collector 42 easy to fabricate, lighter weight and easier to work with. Further, the polymer or composite material is typically dent resistant (due to the considerable amount of material flexibility), it will not rust, can withstand acid wash procedures, and has desired levels of surface friction to insure that concrete will not stick to the surface. These surface characteristics also allow for the easy clean-up of collector 42. Additionally, any concrete or residue that does accumulate on a surface of collector 42 can be easily broken off or chipped away, due to the flexibility of the materials used.

Although not specifically shown, it is also contemplated that specific structures could be formed into composite collector 42 which accommodate attachment. For example, it may be desired to have reinforced mounting structures, so collector is easily bolted to frame portions of the concrete mixer truck 16. In addition to the various advantages outlined above, a polymer or composite material provides several aesthetic advantages. As one example, the composite material can be custom colored to fit the particular design or color scheme of the truck itself. In addition, the composite collector 40 is easily replaced, should they be damaged, torn or punctured. Attachment is typically achieved utilizing shoulder bolts, washers, and other mechanisms which can be easily adjusted. Lastly, the composite materials can be easily formed into specific structures, which allows for the "molding" or creation of specific mounting or attachment features, as needed.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A non-metallic collector for use on a concrete mixer truck, the collector comprising:
   an inner wall structure having a bottom portion, curved and sloping sidewalls extending upwardly and away from the bottom portion, and upright front and back walls extending generally upwardly from the bottom portion, wherein the bottom portion defines an opening;
   an outer wall structure configured to substantially and closely surround the inner wall structure, the outer wall structure attached to the inner wall structure via a plurality of connecting ribs therebetween, the outer wall structure further having a first and second attachment surface configured to cooperate with mounting elements of the concrete mixer truck, the attachment surfaces positioned at a first and second outer edge of the outer wall structure which is adjacent an upper edge of the sidewalls of the inner wall structure;

wherein the inner wall, outer wall, and connecting ribs are formed of a non-metallic material that is capable of being molded, has a predetermined surface friction, and predetermined material strength characteristics.

2. The non-metallic collector of claim 1 wherein the opening is substantially circular.

3. The non-metallic collector of claim 2 further having a plurality of reinforcements formed in the bottom portion which accommodate mounting of the collector to portions of the concrete mixer truck.

4. The non-metallic collector of claim 1 wherein the collector is formed of a polymer.

5. The non-metallic collector of claim 4 further comprising a pair at mounting plates attached to the first and second attachment surfaces, wherein the mounting plates are formed of a metallic material.

6. The non-metallic collector of claim 1 wherein the outer wall structure and inner wall structure are separated by substantially the same distance throughout, thus causing the inner wall structure and the outer wall structure to have substantially the same shape.

7. The non-metallic collector of claim 1 further comprising a plurality of reinforcing indentations in the outer wall structure.

8. A collector for use on a concrete mixer truck to receive concrete from a drum and to distribute the concrete to an adjacent delivery chute, the collector comprising:

a main body having an elongated bowl shaped configuration with a bottom portion defining a bottom opening, curved and sloping sidewall sections extending upwardly and away from the bottom portion, an upright front wall portion extending upwardly and away from the bottom portion and a back wall portion extending generally upwardly from the bottom portion;

wherein the back wall portion has an arced top wall edge which is capable of being positioned adjacent a discharge opening in the concrete mixer drum, and the front wall portion is positioned opposite the back wall portion;

wherein the main body has a first mounting surface and a second mounting surface positioned at an upper edge of the sloping sidewall sections such that a bottom portion of the first mounting section and a bottom portion of the second mounting section are coupled to the sloping sidewalls, and the first mounting section and the second mounting section are coupled to the back wall portion at a back side thereof, and the front wall is also coupled to the first mounting section and the second mounting section;

wherein the first mounting section and the second mounting section are configured to be coupled to a portion of the concrete mixer truck; and wherein the main body is formed of a non-metallic material formed in a two layer structure, wherein an inner wall forms the inner surfaces of the collector and an outer wall forms an outer surface of the collector, the outer wall structure attached to the inner wall structure via a plurality of connecting ribs, the outer wall structure further defining the first and second attachment surfaces and configured to be coupled to mounting elements of the concrete mixer truck;

wherein the inner wall, outer wall, and connecting ribs are formed of the non-metallic material that is capable of being molded, has a predetermined surface friction, and predetermined material strength characteristics.

9. The collector of claim 8 wherein the main body is formed of a polymer.

10. The collector of claim 9 wherein the opening is substantially circular.

11. The collector of claim 8 wherein the front wall portion has an upper edge which extends higher than the upper edge of the rear wall.

12. The non-metallic collector of claim 8 further having a plurality of reinforcements formed in the bottom portion which accommodate mounting of the collector to portions of the concrete mixer truck.

13. The non-metallic collector of claim 8 further comprising a pair of mounting plates attached to the first mounting section and the second mounting section, wherein the mounting plates further accommodate attachment of the collector to the concrete mixer truck.

\* \* \* \* \*